United States Patent [19]

Jesse

[11] Patent Number: 5,342,418
[45] Date of Patent: Aug. 30, 1994

[54] METHOD OF MAKING PELLETIZED FUEL

[76] Inventor: Albert H. Jesse, 113 Wenban Ave., Neenah, Wis. 54956

[21] Appl. No.: 20,447

[22] Filed: Feb. 22, 1993

Related U.S. Application Data

[63] Continuation of Ser. No. 514,439, Apr. 25, 1990, abandoned.

[51] Int. Cl.$^5$ ................................................. C10L 7/00
[52] U.S. Cl. .......................................... 44/589; 44/590; 44/605
[58] Field of Search ........................... 44/589, 590, 605

[56] References Cited

U.S. PATENT DOCUMENTS

| | | | |
|---|---|---|---|
| 4,236,897 | 12/1980 | Johnston et al. | 44/589 |
| 4,529,407 | 7/1985 | Johnston et al. | 44/589 |
| 4,798,603 | 1/1989 | Meyer et al. | 604/379 |

FOREIGN PATENT DOCUMENTS

| 0057796 | 4/1982 | Japan | 44/589 |
|---|---|---|---|

OTHER PUBLICATIONS

"Fuels and Their Combustion" by Haslam & Russell Chapter 13, 1924.

*Primary Examiner*—Prince Willis, Jr.
*Assistant Examiner*—M. Nuzzolillo
*Attorney, Agent, or Firm*—Thomas D. Wilhelm

[57] ABSTRACT

A pelletized fuel is disclosed, made with cellulosic fiber and thermoplastic resin. Preferred embodiments of the pelletized fuel are adapted to be fed in admixture with coal, into conventional coal fired furnaces using conventional coal handling equipment. The preferred pelletized fuel has appropriate mass density and bulk density, and is shaped such that it maintains a generally uniform admixture with the coal during conventional handling, and, upon combustion, produces heat similar to that of coal, thereby minimizing the process adaptations required to convert a furnace from using a conventional coal fuel supply, to a fuel supply comprising a mixture of coal and the pelletized fuel. The invention comprehends methods of making the pelletized fuel, and methods of firing a furnace using the pelletized fuel.

6 Claims, 3 Drawing Sheets

METHOD OF MAKING PELLETIZED FUEL

This application is a continuation of application Ser. No. 07/514,439, filed Apr. 25, 1990, now abandoned.

BACKGROUND OF THE INVENTION

This invention relates to environmental concerns about the disposal of waste materials in landfills. It relates especially to the use of selected waste materials as fuel, as an alternative to disposing of those waste materials in landfills.

Communities and industry have from time to time explored means for producing useful products from waste material. Some of those efforts have been directed toward producing solid fuel products from waste. A variety of communities have, for example, attempted to convert the non metallic portion of their municipal garbage as picked up from, e.g. residential areas, into solid fuel, for use in industrial furnaces, e.g. to generate power. But such projects have, on the whole, met with marginal success.

A companion problem is that users of solid fuels have experienced periodic increases in the cost of such fuels, whereby alternate, and more cost effective fuels, would be desirable, so long as the alternate fuels meet the necessary performance specifications.

It is an object of this invention to provide an alternate solid fuel, made from waste materials comprising cellulosic fiber and thermoplastic resin, wherein the alternate fuel preferably has a heat output similar to that of coal, and preferably is adapted to be used in admixture with coal, and handled using standard coal handling equipment.

It is another object to provide such an alternate fuel with predictable and consistent burning, and material handling properties, whereby the alternate fuel can be reliably fed to the furnace in combination with coal.

It is still another object to provide a pelletized alternate fuel, for admixing and feeding with coal, wherein the pellets are dimensioned such that the pelletized fuel is consumed in conventional coal fired furnaces during approximately the same time period as the coal admixed with it.

It is another object to provide a pelletized alternate fuel to completely replace the conventional fuel, such as natural gas, propane, oil or wood in burners which are capable of burning solid fuel in pelletized form.

It is yet another object to provide such fuel having an ash content between about 1.0% and about 7.0% by weight.

It is a further object to provide pelletized fuel comprising random arrangements, along the lengths of the pellets, of layers of cellulosic fiber elements and thermoplastic resin elements, the layers being disposed transverse to the lengths of the pellets.

It is a further object to control the density and burning characteristics of the fuel by selecting loose and light-weight fiber or sheet for at least a part of the cellulosic film component.

Another object is to provide fuel pellets made from conventional disposable diaper stock.

A further object is to provide fuel pellets made from conventional disposable hygiene pad stock.

A further object is to provide a method of making pelletized fuel with a cellulosic fiber component and a thermoplastic resin component.

Finally, it is an object to provide a method of firing a furnace using conventional coal handling equipment, including selecting appropriate pelletized fuel which is adapted for being handled in a conventional manner when admixed with coal.

SUMMARY OF THE DISCLOSURE

Certain of the objectives are obtained in a pelletized fuel, the composition of the fuel comprising about 40% to about 90% by weight on bone dry basis of a first cellulosic fiber element, and about 10% to about 60% by weight of a second thermoplastic resin element, the composition comprising less than 15% by weight water, on an overall as is basis. The composition of the fuel is susceptible of being bonded together, in fabrication of pellets thereof, by bonding properties inherent in the composition when the composition is extruded as a plurality of sequential layers, and is subsequently cooled. The fuel is combustible to produce a heat output of about 8000 to about 14000 preferably about 9000 to about 13000, more preferably about 9500 to about 11,500, Btu per pound. The pellets are dimensioned, and, where the composition is within the range of 60% to 90% fiber and 40% to 10% resin, the pellets in quantity have bulk density such that the pellets are susceptible of being uniformly mixed with conventional coal, to form a fuel mixture of the pellets and coal, and wherein the mixture is susceptible of being fed to a standard coal fired furnace using standard coal handling equipment, while maintaining general uniformity of the fuel mixture through the introduction of the fuel mixture into the combustion chamber of the furnace.

A preferred composition of the fuel comprises about 70% to about 85% by weight, on bone dry basis, of the cellulosic fiber element, about 15% to about 30% by weight of the thermoplastic resin element, and no more than about 7% by weight water, on an overall as is basis.

In achieving maintenance of the general uniformity of the mixture of coal and pellets, the fuel preferably comprises a mass density of about 0.80 to about 1.3, preferably about 0.85 to about 1.1, and a bulk density of about 32.5 to about 37.5, preferably about 33 to about 36, pounds per cubic foot.

Preferably, for pellets which are to be admixed with, and burned with, coal, less than about 5% by weight of the pellets will pass through a 0.38 inch wire sieve, and substantially all of the pellets will pass through a 1.25 inch wire sieve.

Also, preferably such pellets have an average cross-section, preferably cylindrical, of about 0.37 to about 0.63 inch and an average length of about 0.5 inch to about 1.5 inches, whereby pellets of the fuel are consumed in conventional coal fired furnaces during approximately by the same time period as coal admixed therewith.

Ash content of the pelletized fuel is preferably between about 1.0% and about 7.0% by weight on an overall as is basis.

In preferred embodiments, the compositions of the pellets have environmentally acceptable quantities of heavy metals, and are free from non-resinous and non-cellulosic household waste; and non-combustible inorganic coatings on surfaces of the cellulosic fiber element comprise no more than about 10% by weight of the cellulosic fiber element.

Typically, the pellets of the fuel comprise random arrangements of layers of the cellulosic fiber element and the thermoplastic resin element, along the lengths of the pellets, the layers being disposed transverse to the lengths of the pellets.

Also typically, the concentration of the thermoplastic resin, along the outer surface along the length of a randomly selected one of the pellets, is greater than the average concentration of thermoplastic resin in the one pellet; and pellets having about 25% to about 40% by weight thermoplastic resin may comprise a skin along the outer surfaces along the length thereof, the skin comprising a substantially continuous phase of the thermoplastic resin, and representive components, comprising a discontinuous phase of the cellulosic fiber element, disbursed therein.

In some embodiments, the cellulosic fiber element preferably comprises about 10% to about 90%, preferably about 30% to about 70%, more preferably about 30% to about 50%, by weight, on an as is basis, of a first light cellulosic fiber component, comprising loose and light-weight fiber or sheet having sheet wet strength less than the wet strength of conventional newspaper stock, and about 90% to about 10%, preferably about 30% to about 70%, more preferably about 50% to about 70%, by weight of a second heavy cellulosic fiber component, comprising compacted sheet having wet strength at least as great as the wet strength of conventional newspaper stock.

One suitable composition, which can be used by itself for fabricating the pelletized fuel of this invention is the composition of conventional disposable diapers, including the plastic outer layer, the absorbent fibrous batting and the liquid transport layers adjacent the inner surface of the diaper. Conventional superabsorbents are acceptable for inclusion therein.

Another suitable composition, which can be used by itself for fabricating the pelletized fuel of this invention is the composition of conventional disposable hygiene pads, including plastic outer layer and release paper, absorbent fibrous batting and optionally an inner surface layer comprising synthetic fibers, the inner surface layer being adapted for placement against the body.

Other objects of the invention are obtained in a method of making pelletized fuel, the fuel being susceptible of being uniformly mixed with conventional coal to form a fuel mixture of the pellets and coal, the mixture being susceptible of being fed to a standard coal fired furnace using standard coal handling equipment, while maintaining general uniformity of the fuel mixture through the introduction of the fuel mixture into the combustion chamber of the furnace. The first step of the method comprises selecting, as elements of the fuel, and to make the composition thereof, waste material comprising about 60% to about 90% by weight, on a bone dry basis, of a first cellulosic fiber element, the first cellulosic fiber element comprising at least about 10% by weight, on an as is basis, of loose and light-weight fiber or sheet having sheet wet strength less than the wet strength of conventional newspaper stock; and about 40% to about 10% by weight, on an overall as is basis, of a second thermoplastic resin element, the composition of the fuel comprising less than 10% by weight, on an overall as is basis, of water. The method further comprises feeding the waste material through size reducing apparatus adapted to reduce the size thereof to length and width dimensions of about 0.2 times to about 8 times the cross-section of the fuel pellets to be made therefrom, and thereby reducing the waste material in size, accordingly. The method yet further comprises feeding the size-reduced waste material through a pellet mill, including forcing the waste material through a pelletizing die, and thereby fabricating pellets of the fuel, including supplying sufficient water, as necessary, in the pellet mill such that the pellets so produced comprise about 1.5% to about 10% by weight water on an overall as is basis, and applying sufficient heat, as necessary, in the pellet mill to soften a sufficient amount of the second thermoplastic resin element, along longitudinal outer surfaces of the pellets as the pellets are being formed, to thereby lubricate the waste material as the pellets are being extrusion fabricated, and to assist in bonding the layers of the first and second elements together at the longitudinal outer surfaces of the pellets as they are being formed; and screening the pellets so produced and thereby removing material passing through 0.38 inch wire mesh.

In preferred embodiments, the method includes selecting as the first cellulosic fiber element, a mixture of about 70% to about 85% by weight of the first loose light-weight fiber or sheet component, and about 15% to about 30% by weight of the second heavy cellulosic fiber component, the second component comprising compacted sheet having wet strength at least as great as the wet strength of conventional newspaper stock.

In some embodiments, the method of making the pelletized fuel includes selecting (i) waste conventional disposable diaper stock, whereby the first cellulosic fiber element comprises the cellulosic fiber contained in the diaper stock, and the thermoplastic resin element comprises the thermoplastic outer layer in the diaper stock or (ii) waste conventional disposable hygiene pad stock, whereby the first cellulosic fiber element comprises the cellulosic fiber contained in the hygiene pad stock, and the thermoplastic resin element comprises the thermoplastic outer liner in the hygiene pad stock.

Preferably, the method includes selecting the composition of the pelletized fuel so produced such that the heat output is between about 9500 and about 11,500 Btu per pound, and such that the pellets are so dimensioned that the pelletized fuel is consumed in a standard coal fired furnace during approximately the same time period as coal admixed therewith.

Still other objects of the invention are obtained in a method of firing a furnace, using conventional coal handling equipment, the method comprising the steps of (i) mixing together, with conventional coal handling equipment, at least about 50% by weight coal, and no more than about 50% by weight of a pelletized fuel, disclosed herein as suitable for mixing with coal, thereby to form a generally uniform fuel mixture thereof, (ii) moving the mixture to the furnace, and into the combustion chamber of the furnace, including transport in the combustion chamber, using conventional coal handling equipment for the moving, the mixture maintaining its general uniformity throughout the moving, and (iii) burning the fuel mixture.

In preferred embodiments, the method of firing a furnace includes selecting the composition of the pelletized fuel such that the heat output thereof is between about 9500 and about 11,500 Btu per pound, and such that the pellets are so dimensioned that the pelletized fuel is consumed in the furnace during approximately the same time period as the coal.

DETAILED DESCRIPTION OF THE ILLUSTRATED EMBODIMENTS

Requirements of an Alternative Fuel Product

In order for an alternative fuel product to be useful on a large scale in a variety of coal burning furnaces as an in-combination admixture with coal, it is necessary that it be able to easily make uniform mixtures of the alternative fuel product with coal. The alternative fuel product should respond to the operation of conventional coal handling equipment in much the same way coal responds. It should burn over approximately the same time period over which the coal, with which it is mixed, burns; and it should produce a similar level of heat of combustion as measured in Btu/lb. Namely, it should mix well with the coal, should be handleable using the same equipment as is normally used with coal, and should burn as long as the coal.

A number of secondary requirements will be known to those skilled in the combustion arts. Coal is fed into conventional coal furnaces by underfeed stokers, vibrating grate stokers, chain and traveling grate stokers, spreader stokers, and the like. Conventional coal combustion operation depends upon a certain amount of ash being generated as the coal burns on these coal carriers. The ash serves as an insulator, protecting the fuel carrier from the direct furnace heat. If the fuel carrier is not so protected from the direct furnace heat, the fuel carrier is subject to premature failure due to overheating. Accordingly, it is important that any alternative fuel produce sufficient ash to protect the equipment which supports or carries the fuel in the furnace. A suitable ash content is at least 1% by weight, whereby the fuel carrying equipment is suitably protected. It is preferred that the ash content be no greater than about 7% by weight so that ash recovery and disposal requirements are properly minimized. Also, the alternate fuel should not cause an excessive increase in the ash build-up on the heat exchange surfaces.

The alternative fuel should not create any more pollution problem than is regularly encountered with combustion of coal. Accordingly, sulfur content should be no more than about 0.15% by weight; and heavy metals (e.g. arsenic, barium, beryllium, cadmium, chromium, lead, mercury, nickel, selenium, silver, and junk and the like) should be present in low enough quantity to not present a hazard to the environment upon burning of the fuel. Nitrogen and chlorine should be present in low enough amounts as to not constitute an environmental hazard.

Finally, an alternative fuel product should, overall, be no more costly to use than conventional solid fuel such as the coal it replaces.

The Pellets

Figure 1:
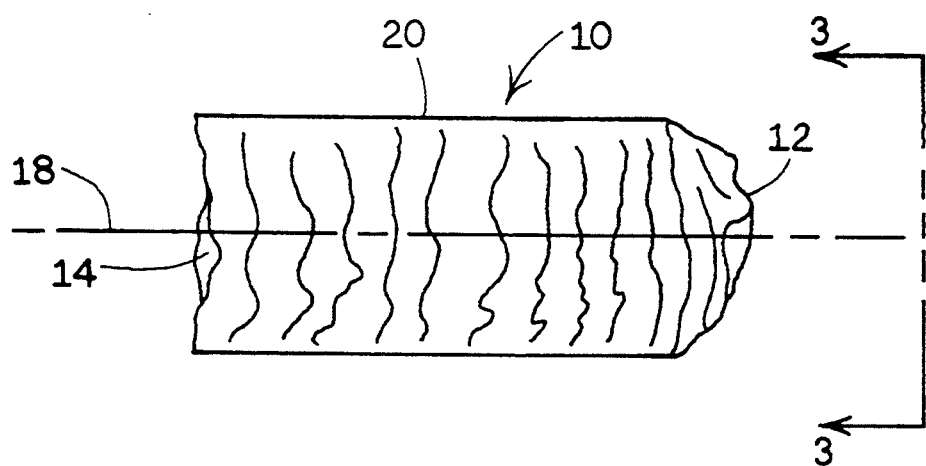
FIG. 1 is a side view of a fuel pellet of the invention.
Figure 2:
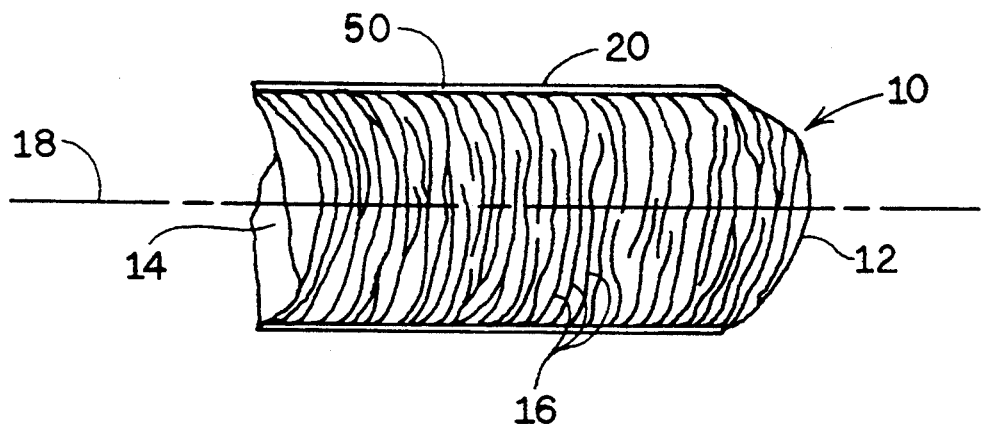
FIG. 2 is a longitudinal cross-section of the fuel pellet of FIG. 1.
Figure 3:
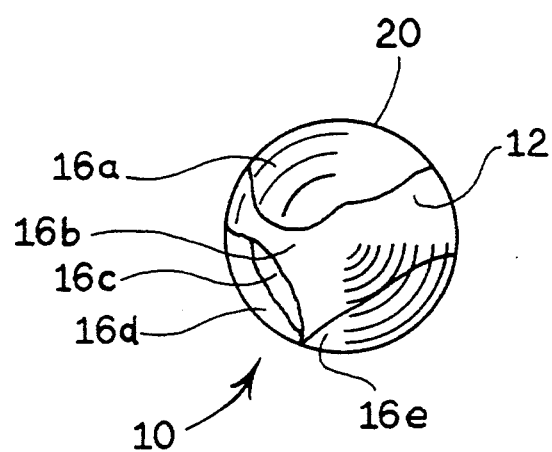
FIG. 3 is an end view of the fuel pellet of FIG. 1, and is taken at 3—3 in FIG. 1.

FIGS. 1, 2 and 3 illustrate the fuel pellets 10 of the invention. Referring first to FIGS. 1 and 3, a typical configuration for the pellets represents a cylinder with a first convex end 12 and a second concave end 14.

The fuel pellet 10 is comprised of a plurality of layers and partial layers 16, stacked one upon another, and extending in a direction generally transverse to the longitudinal axis 18 of the pellet. Layers 16 generally comprise components of the waste materials from which the pellets are made. The layers 16 are typically rather thin, and are packed tightly together in the pellet. The layers 16 are generally bonded to each other at or near the outer longitudinal surface 20 which extends about the circumference of the pellet. Bonding between the layers 16 at positions located inwardly of outer surface 20 is typically less than at outer surface 20.

A transverse surface of the pellet (e.g. either end 12 or 14, or a new surface made by breaking the pellet along a transverse direction) may, and typically does, comprise a plurality of partial layers 16, folded, mixed, and otherwise randomly entwined and entangled with each other. Thus, the surface of end 12 (FIG. 3) illustrates 5 partial layers 16a, 16b, 16c, 16d, and 16e, together forming the end surface. However, the pellets do contain some layers 16 which comprise a single layer element extending across the entire transverse dimensional area of the pellet.

The pellets 10 of the invention are made from a carefully selected composition of waste raw materials. Preferred raw materials are clean mill waste which is produced by manufacturing operations. The raw material composition may comprise a single waste material, or a mixture of waste materials, so long as the required ingredients are present in amounts within the specified ranges. The raw material suitable for use in this invention is generally secured in the form of sheets, films, batts, bulk fiber, or the like, or is readily converted to one or more of those forms.

The composition of raw material suitable for use herein generally comprises about 40% to about 90%, preferably about 75% to about 85%, by weight cellulosic fiber, and about 10% to about 60%, preferably about 15% to about 25%, by weight thermoplastic resin, based on dry weight. At least 60% cellulose is required where the pelletized fuel is to be mixed with coal, in order to ensure sufficient ash content, and to ensure against excessively high heat output which could overheat the coal carrying equipment. At greater than 90% cellulose, there is insufficient thermoplastic resin to properly lubricate the die in the pellet mill, whereby at least 10% resin is required. At greater than 40% thermoplastic resin, the heat output is higher than desired for use with coal, and ash content may be too low. However, up to 60% resin can be used if coal admixture is not an issue. At over 60% resin, the preferred pellet extrusion process, as disclosed hereinafter becomes more difficult, and the pellet density is reduced, whereby over 60% resin is generally not preferred.

Where the fuel pellets are to be used with conventional coal handling equipment, the cellulose element of the pellet composition includes at least about 10% by weight on an as is basis, of the cellulose element, of a first fiber component comprising loose and light-weight fiber or sheet. Typical of the first fiber component is loose batting as in an absorbent hygiene pad or diaper, facial tissue, toilet paper, and the like. If the cellulosic element contains less than 10% of the first component fiber, the pellets can be difficult to fabricate by the extrusion process disclosed hereinafter, and the pellets can be too dense to feed well in admixture with coal. If it contains greater than 90% of the first component fiber, the pellets can be too light to feed well in admixture with coal. So the amount of loose or light fiber is specified at 10% to 90% by weight, preferably 30% to 70%.

The balance of the cellulosic element is a second component comprising a more dense cellulosic fiber stock such as newspaper, card stock, corrugated cardboard, coated or uncoated carton stock and the like. Especially desirable dense cellulosic fiber stocks are, for example; wax coated single layer cardboard or three ply corrugated board, and about 90 lb. to about 180 lb. carton stock, coated with wax, polyethylene, or the like. The fiber contribution, of a given composite raw material stock, to the overall raw material composition, is based only on the fiber content of the stock.

Generally, the cellulosic fiber element comprises no more than about 10% by weight non-combustible inorganic coatings on the surfaces of the cellulosic fiber element, since the non-combustible component will increase the normal ash load.

Thermoplastic resins suitable for use as the second element of the compositions of fuel pellets of the invention are illustrated generally by the polyolefins such as polyethylene, polypropylene, polybutylene, and the like. Other thermoplastic resins are suitable so long as they have softening properties similar to the polyolefins, whereby they serve as lubricants for fabricating the pellets, and as bonding agents to assist in bonding the layers together to make the pellets. Low molecular weight resins such as waxes are acceptable, and are preferred for their lubrication properties and their ability to soften and flow at low temperatures to assist in the bonding together of the pellets during pellet fabrication. Smaller amounts (e.g. up to about 10% by weight of the composition) of resins having softening temperatures substantially above those of the polyolefins can be used so long as they comprise no more than half of the resin element.

Thermoplastic resins whose combustion produces harmful stack gas emissions are not acceptable for use in any more than nominal amounts in the pelletized fuel composition of this invention.

Similarly, compositions which produce objectionable quantities of heavy metal waste either in the ash or in the stack gas are not acceptable for use to make the fuel pellets of the invention.

Suitable fuel compositions are obtained by using solely the stock content of certain single products, for example, disposable diapers and disposable hygiene pads. Exemplary diapers are presently marketed under the trade names Kimbies, Pampers, and Luvs and the like. Exemplary hygiene pads are presently marketed under the trade names Kotex, Always, New Freedom, Light Days, and the like. Such products include containment resin layers, absorbent batting layers, and a variety of transport and utility layers made with paper, non-wovens, and the like. Some of these products also contain so-called super absorbent materials, which are acceptable in the quantities presently being used.

Fuel pellets having the above compositions produce heat of combustion in the range of about 8000 to about 14000 Btu/lb., which is generally acceptable for use in admixture with coal having a heat of combustion of about 12,500 to about 13,000 Btu/lb. Preferred heat of combustion is about 9000 to about 13000 Btu/lb., with a target range of about 9500 to about 11,500 Btu/lb.

The pellets, such as those illustrated in FIGS. 1–3, are configured such that they are free from sharp corners along the lengths of the pellets, and are suitably dimensioned such that they maintain uniform admixture with the coal with which they are mixed. Suitable dimensions for pellets to be admixed with Types I, II, III, and IV stoker coal are about 0.37 to about 0.63 inch, preferably about 0.5 inch, cross-section (e.g. diameter) and about 0.5 to about 1.5 inch average length, typically with a variable range of lengths in a given production quantity, the range being between about 0.38 inch and about 2 inches. By proper selection of the raw materials from within the composition ranges given, pellets can be produced having mass density of about 0.80 to about 1.3, preferably about 0.85 to about 1.1, with a resulting bulk density of about 32.5 to about 37.5, preferably 33 to 36 pounds per cubic foot, with target bulk density of 34 pounds per cubic foot. The density range of such pellets at 0.8 to 1.3 is generally lighter than the density of coal which is well known to be 1.25 to 1.7. Nonetheless, the pellets remain uniformly mixed during conventional handling; and they produce the desired heat of combustion, and burn over essentially the same time period as coal. Accordingly, such fuel pellets are suitable for use in combination with the recited grades of coal. Given the above parameters, suitable pellet dimensions and heat output can now be obtained for use with any coal specified for burning on a supporting surface.

Method of Making the Pellets

Figure 4:
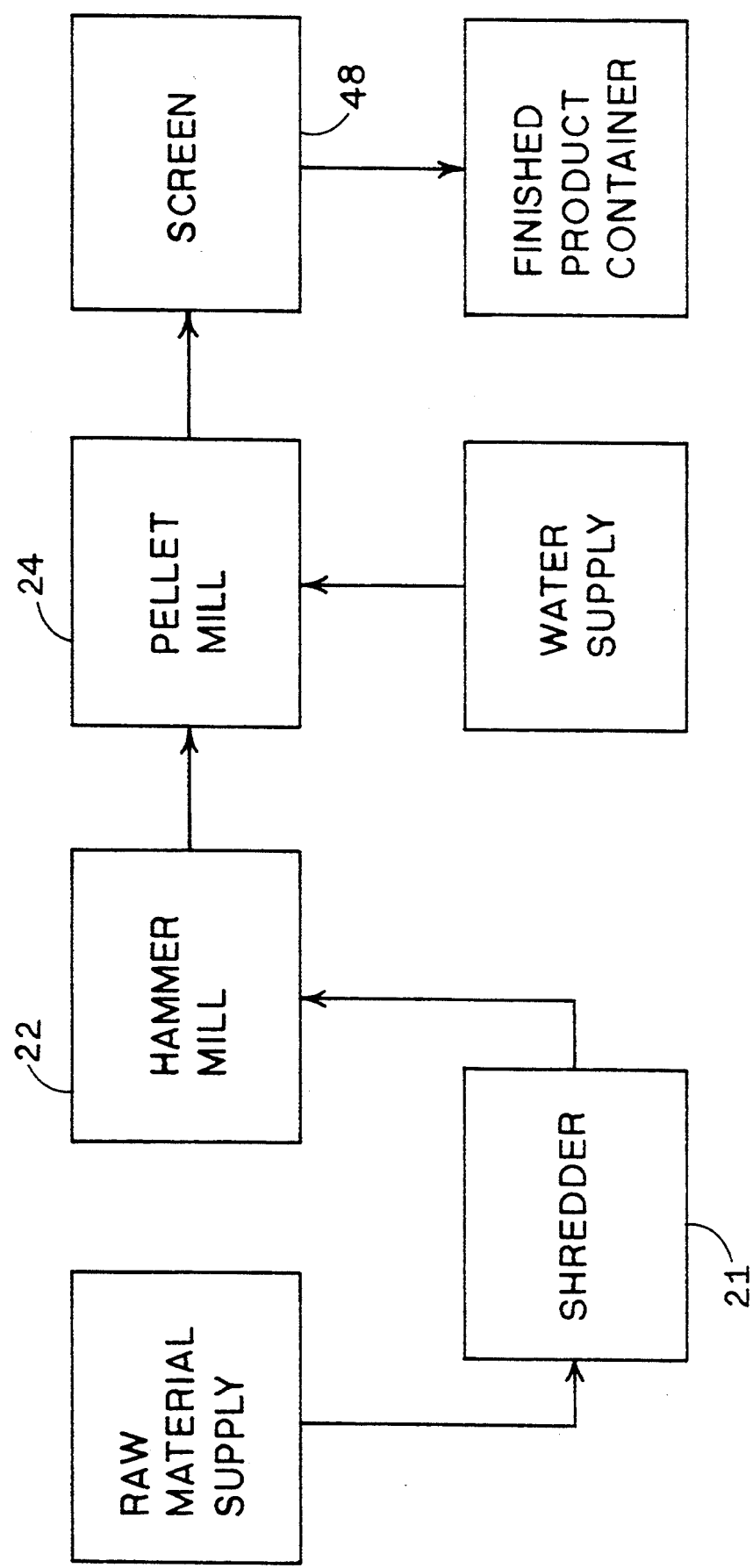
FIG. 4 is a block diagram of the process of making fuel pellets in this invention.
Figure 5:
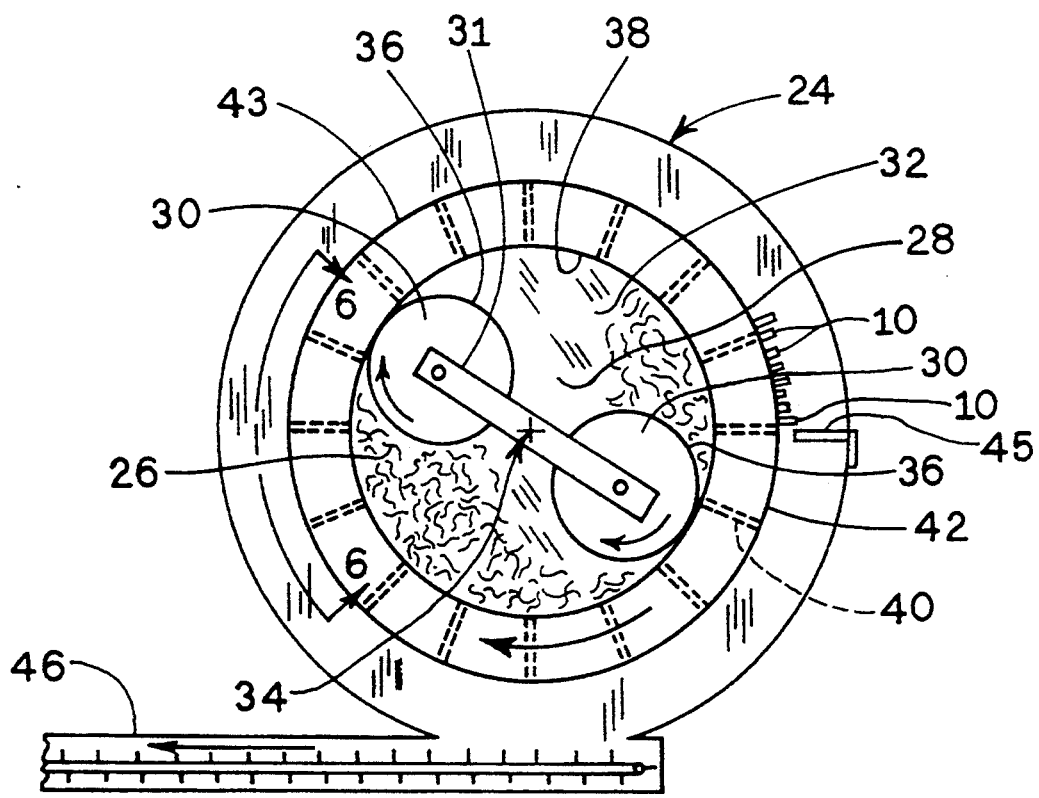
FIG. 5 shows an interior view of selected elements of a pellet mill useful in this invention.
Figure 6:
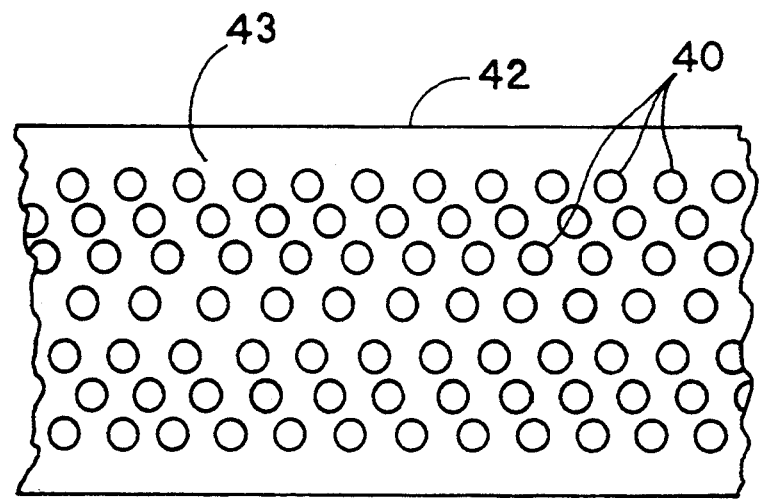
FIG. 6 shows a portion of the exterior die surface in the pellet mill and is taken at 6—6 of FIG. 5.

FIGS. 4–6 illustrate the method and apparatus for making the fuel pellets of the invention. As seen in FIG. 4, the raw materials, as described and defined above, are preferably fed into a shredder 21, which does the initial size reduction, and from there into a hammer mill 22 or other size reducing apparatus, where the raw material is further reduced to the desired size. Acceptable such size reducing apparatus for both the shredder and the hammer mill, is available from Williams Patent Crusher and Pulverizer Company, St. Louis, Mo. As used herein, a shredder does not necessarily have a size controlling exit screen. A hammer mill does have a size controlling exit screen which controls the size of the exiting milled material.

In the size reducing apparatus, namely the shredder and the hammer mill, the raw material is reduced in size such that its dimensions, along arbitrarily selected length and width axes, are about 0.2 to about 8 times the dimension across the cross-section, e.g. diameter, of the pellets being made, and accordingly the diameter of the die holes 40. The size of the size-reduced materials coming out of the hammer mill is readily controlled by installing, in the hammer mill, the appropriate exit screen which passes only material which has been properly reduced in size.

Size reduced material from the hammer mill 22 is fed to pellet mill 24. A suitable pellet mill is available from California Pellet Mill Company, San Francisco, Calif. The pellet mill 24 is generally conventional in design. As illustrated in FIG. 5, the front wall of the mill has been removed to generally show the operating principles in the interior of the mill, for the purpose of illustrating the fabrication of the pellets. The details of the pellet mill structure and operation are not shown, however, as these are well known in the pelletizing art.

Raw material 26 from hammer mill 22 is fed into the interior receiving chamber 28 of the pellet mill, wherein the illustration shown in FIG. 5 views receiving chamber 28 from front to rear. Receiving chamber 28 is defined by the interior surface 38 of die 42, and by the rear wall 32, and the front wall, not shown. Pressure discs 30 extend from the front wall of the receiving chamber 28 to the rear wall 32. Discs 30 are rotatably mounted on a stationary yoke 31 which is preferably centered about the central axis 34 of chamber 28. Die 42 is also rotationally mounted about central axis 34, by gearing apparatus, not shown, and for example located behind rear wall 32. As die 42 rotates, its interior surface 38 presses against the outer surfaces 36 of discs 30, causing rotation of discs 30. The size-reduced raw material 26 is trapped between the round surfaces 36 and 38 as the die 42 revolves and discs 30 rotate, whereby the material is pressed into die holes 40 in the die 42, the holes 40 extending through die 42 from interior surface 38 to exterior surface 43. A few of the die holes are shown in dashed outline in FIG. 5 to illustrate their location in the mill. FIG. 6 shows a view of the outlet surface of die 42, whereby the close spacing of holes 42 is illustrated. Holes 40 are essentially spaced as close together as practical while maintaining the structural integrity of die 42.

Accordingly, as die 42 rotates, pressing the raw material 26 against outer surfaces 36 of discs 30, the raw material is forced into holes 40. As the die 42 continues to rotate, and size-reduced raw material is continuously fed into receiving chamber 28, additional quantities of the size reduced raw material are forced into holes 40, forcing a continuous advance of raw material through holes 40, from the interior surface 38 to the exterior surface 43. The raw material thus is pushed in a steady progression through holes 40.

As raw material 26 is pushed through holes 40, it resists being pushed through the holes 40 which have smaller diameters than, for example, one dimension of the raw material pisses being pushed through them. Accordingly, there is friction between the material and the side walls 40. In order to advance the material through holes 40, additional material behind it must be pushed with substantial power by means of the pressure between die 42 and discs 30. As the additional material, which is disposed closer to interior surface 38, is pushed into holes 40, it is tightly packed against the material already in the holes, which material is disposed closer to exterior surface 43, and moves the composite of material outwardly against the frictional resistance between the walls of holes 40 and the material 26.

The friction creates heat which softens the thermoplastic resin in the raw material, and causes some softening and hydrogen bonding of the cellulose fibers in the presence of the available water. Especially the softened resin serves as a lubricant to facilitate movement of the material through die holes 40. Small amounts of moisture are also present, and will assist in the lubrication function.

The frictional resistance in die holes 40, in combination with the regular feeding of more material into holes 40 by disc 30, results in the raw material being tightly packed in a random arrangement of layers and partial layers extending generally transverse to the longitudinal axis of a given hole 40, and thus transverse to the length of the pellet being formed. The tight packing produces the friction which produces heat. While additional heat may be applied by e.g. resistance heaters in die 42, in typical practice, the heat produced by the friction in the die is sufficient for satisfactory operation of the pellet mill.

As the packed material is pushed through die holes 42, the packed layers are bonded to each other. The primary bonding takes place at and adjacent the outer surfaces 20 of the pellets. Secondary, and typically lesser, amounts of bonding occur between the layers 26 on the interior of the pellet. The bonding appears to be a function of discontinuous segments of resin interacting with adjacent cellulose fibers whereby the resin bridges the fibers and holds them together, supplemented by mechanical fiber entanglement at the outer surface 20 and some hydrogen bonding of cellulose fibers, assisted by the moisture present, throughout the pellet.

As the formed pellets are extruded through die 42, and exit at outer wall 43, they tend to break off due to weight of the extrudate, the vibration of the mill, or the like, and fall down onto conveyor 46 and are transported to screen 48. Stationary knife 45 is adjustably mounted through side wall 47, for disposition at a distance spaced from and transverse to, the circumference of outer surface 43 of rotating die 42. Knife 45 breaks off any pellets 10 which are long enough to impact against the knife as they rotate, with die 42, past knife 45. A few illustrative pellets 10 are shown exiting die 42 adjacent knife 45 in FIG. 5. At screen 48, the pellets are passed through a 0.38 inch screen to remove fines. The pelletized product which does not pass through the 0.38 inch screen is then transported e.g. by conveyor to the finished product container.

In economical and sustained operation of the process, it is critical that the raw material feed to the hammer mill be carefully selected and controlled to be within the given parameters. It is also important to monitor the pellets produced and the power consumption of the pellet mill in order to produce pellets which are tightly enough packed, and which have sufficient resin, to obtain (i) lubrication of the die 42, in combination with both (ii) mass density and bulk density within the defined parameters, so that the pellets will feed properly with coal and will produce (iii) the desired heat of combustion. Packing density can be increased by using more and/or heavier cellulose stock, and reduced by the reverse. Heat of combustion can be increased by increasing density and by increasing the resin amount. Bonding and pellet mill lubrication can be increased by increasing the resin fraction, and by increasing the moisture content of the raw material in pellet mill 24. Typically, a small amount of water is added to the raw material in the pellet mill before the raw material is pushed into die holes 40. The amount of water is typically that amount which yields pellets having stabilized moisture content, after cooling, of about 1% to about 6% by weight, preferably not more than 10%, and with an upper limit of 15% by weight water. The amount of water is preferably small, whereby the heat of combustion of the pellets is not greatly affected.

Increasing, or excessive power consumption in pellet mill 24 indicates that the material 26 might be packing tighter than desirable in holes 40 of die 42, thereby putting excessive stress on the mill in fabrication of the pellets. Too tight packing of the pellets can result in the density being higher than specified, whereby the pellets may not maintain good admixture with coal.

Decreasing or low power consumption indicates loosely packed pellets which may not have sufficient bonding to ensure pellet integrity, may have density lower than specified, whereby the pellets may not maintain good admixture with coal, and may have a low heat of combustion.

The preferred pellet extrudate is lightly bonded together at the outer surface, with periodic random weak spots about its periphery e.g. every inch or so along the length of the extrudate, such that the extrudate is readily broken off by gravity, vibration, a stationary knife 45, or the like, at spaced locations along the length of the extrudate to yield pellets having a range of lengths of about 0.38 to about 2.0 inches, with the average length preferably being between about 0.5 inch and about 1.5 inches.

In some applications of the pelletized fuel of this invention, a more durable pellet may be desired, such as for shipping the product longer distances. In such case the resin content may be decreased and the water content increased in order to effect a higher level of hydrogen bonding among the fibers. Further the amount of hydrogen bonding is increased by using less of the light and loose film and more of the heavy and compacted fiber sheet.

In some pellets, the resin can be increased high enough that the pellets have a skin characterized as a substantially continuous phase of the resin, and representative components, comprising a discontinuous phase of the cellulosic fibers, disbursed in the resin. Especially when the pellets comprise such a skin, the surface tension in the substantially continuous phase tends to draw the resin, from areas adjacent the outer surface 20, to the outer surface and the skin such that, in the pellets so produced, the concentration of thermoplastic resin along the outer surface 20 is greater than the concentration thermoplastic resin contained in the overall pellet composition, whereby a disproportionate amount of resin is concentrated in the skin. The skin 50 is illustrated in FIG. 2 by the double lines at outer surface 20.

Preferred heat output of the fuel pellets, when burned in admixture with stoker coal, Types I, II, III, and IV, is about 9500 to about 11,500 Btu/lb.

Method of Firing the Furnace

A conventional coal fired furnace is operated, using the pellets of the instant invention in admixture with coal, in essentially the manner as it is operated using 100% conventional coal fuel. First the pellets and the coal are mixed, using suitable mixing equipment, at a mix fraction of about 50% to about 95% by weight coal and conversely about 50% to about 5% by weight pellets. It is of course, technically feasible to use a lesser quantity of pellets, but generally it is not economically feasible to use less than 5% pellets.

The mixture is then transported to the furnace, preferably using conventional coal handling equipment, and is transported into the furnace combustion chamber, and including transport in the combustion chamber, using conventional coal handling equipment, as follows. For example, the coal and pellets can be stored separately in separate storage bunkers. Accordingly, if coal only is desired in the furnace, coal can be drawn from its bunker and transported by e.g. belt conveyor to a bucket conveyor, whereby it is elevated to the coal hopper. From the coal hopper, the coal passes to the coal scale, and thence to the distribution hoppers adjacent the combustion chamber. From the distribution hoppers, the coal is fed into the combustion chamber by conventional coal carrier equipment, such as a stoker grate or the like.

When a mixture of coal and pellets is desired, the pellets can be let down onto the same coal-carrying belt conveyor leading from the storage bunkers, whereby the coal and pellets are initially intermingled by the let-down process on the bunker conveyor. The coal and pellets are further mixed in the normal handling on the bucket conveyor, in the coal hopper and scale, and in the distribution hoppers. Accordingly, because the pellets readily admix with coal, the normal mixing which occurs during normal transport from the storage bunkers to the furnace is sufficient to effect sufficient mixing, whereby, in some equipment set-ups, no special mixing equipment, process or step is required, so long as the pellets mix readily with the coal; the ready mixing being controlled by the proper specification and control of the shape, dimensions, and mass density and bulk density of the pellets.

The amount of coal that can be replaced by fuel pellets of this invention, in a conventional coal fired furnace, can be at least as high as 50% by weight. But in some furnaces, the tolerance for replacement is lower. Generally, the fraction of the coal which can be replaced by the pellets of this invention depends upon the type of feeding system which feeds the fuel to the furnace. Usually at least 10% of the coal can be replaced.

The shape of the pellets is important to proper mixing with coal. For example, pelletized fuel wherein the pellets have square cross-section, and are otherwise the same as the herein defined pellets, does not maintain a uniform admixture with coal, and accordingly is not acceptable for mixing with coal. Accordingly, the pellets should not have more than one effective sharp corner/edge along the longitudinal length thereof, such as the corners of a square, and preferably the pellets have no sharp corners/edges at all. However, the cross-section need not be round. It can be, for example, oval or elliptical.

The preferred raw material composition for making the pellets is, by weight, about 15%–30% polyolefin resin, either as film or as coating on fiber stock.
3%–7% wax, typically as coating on board stock.
70%–85% cellulosic fiber, as paper, board, batting, or the like.

The wax is highly desired for its low softening temperature, whereby it readily lubricates the pellet mill die and assists in bonding the pellets at the outer surfaces 20 as they are being formed at the frictionally warmed surfaces of die holes 40. The polyolefin resin, or other suitable high molecular weight resin, is desired for its high heat of combustion. The cellulose fiber, and especially the loose and light fiber, is desired for its contribution to controlling the density of the pellets, and preventing such tight packing in the die holes 40 as to preclude effective movement of the size-reduced material 26 into and through die holes 40.

THE EXAMPLES

Samples of pellets of this invention were tested and characterized as shown in Table 1. Heat output is reported in Btu per pound of fuel.

TABLE 1

| Ex. No. | Moisture | Ash | Volatile Matter | Fixed Carbon | Sulfur | Heat Output |
|---|---|---|---|---|---|---|
| 1 | 2.8% | 3.1% | 89.5% | 4.6% | .07% | 8912 |
| 2 | 5.9% | 5.9% | 89.0% | — | .07% | 9966 |
| 3 | 2.6% | 6.3% | — | — | .05% | 14,382 |
| 4 | 1.9% | 2.9% | 85.5% | 9.7% | .20% | 10,180 |

Example 3 represents an early prototype sample, before raw material feed was optimized, and represents product of this invention, but near the outer limits as to heat output. Example 4 represents a sample of the invention which is high in sulfur content for this invention.

Further samples of the pelletized fuel were tested for heavy metal content, and were reported as shown for Example 5 in Table 2.

TABLE 2

| Metal | Ex. 5 |
| --- | --- |
| Arsenic | 0.1 ppn |
| Beryllium | 0.2 ppn |
| Cadmium | 0.1 ppn |
| Chromium | 31.6 ppn |
| Lead | 2.3 ppn |
| Mercury | 0.1 ppn |
| Nickel | 0.8 ppn |
| Zinc | 49.6 ppn |

Pellets were mixed with an equal weight of coal and the mixture tested for composition and reported as in Table 3. Example 6 is at high fire analysis. Example 7 is at low fire analysis.

TABLE 3

| Ex. No. | Moisture | Ash | Volatile Matter | Fixed Carbon | Sulfur | Heat Output |
| --- | --- | --- | --- | --- | --- | --- |
| 6 | 3.6 | 6.6 | 55.2 | 34.7 | 0.9 | 12,436 |
| 7 | 3.6 | 7.8 | 45.3 | 43.2 | 0.8 | 12,759 |

Burning tests were conducted in the coal furnace used to generate commercial quantities of power in a university power plant. The fuel mixture was 50% coal, 50% pellets by weight. Stack gas emissions and residual ash were analyzed for environmental acceptability. Both the stack gas and the ash were judged acceptable. A 50% coal, 50% pellet mixture has now been burned in that furnace for a complete heating season, whereby the long term affect on the furnace and boiler were judged acceptable. By replacing 50% of the coal burned at that facility, cost savings are estimated at about 13% of the cost of producing the same amount of heat with a fuel comprising 100% coal.

In some embodiments, where the pellets are not mixed with coal but are, rather, burned alone in e.g. burners designed to burn pellets, then the density is not so critical, and higher heat output is acceptable, and may be desirable. In such embodiments, the raw material mixture can be as high as 60% thermoplastic resin, whereby the cellulosic fiber element should be represented by a significant fraction e.g. 30%–90% of the loose and light component in order to facilitate transport of the materials through die holes 40 in pellet mill 24.

Those skilled in the art will now see that certain rearrangements, modifications and alterations can be made to fuel pellets using selected waste materials herein disclosed with respect to the preferred embodiments, and the methods of fabrication and burning thereof, without departing from the spirit of the instant invention. All such arrangements, modifications and alternations are intended to be within the scope of the appended claims.

Having thus described the invention, what is claimed is:

1. A method of making pelletized fuel in the form of elongated pellets having an axial length, said method comprising the steps of:
   (a) selecting as elements of said pelletized fuel to make the composition thereof,
      (i) about 60% to about 90% by weight, on a dry basis, of a cellulosic fiber element, said cellulosic fiber element comprising at least about 10% by weight, on an overall basis, of a first cellulosic fiber component having a first density, and no more than about 90% by weight of a second cellulosic fiber component having a second density greater than said first density, and
      (ii) about 10% to 40% by weight, on a dry basis, of a thermoplastic resin element,
   said composition of said fuel comprising less than about 15% by weight water on an overall basis;
   (b) feeding said elements through size reducing apparatus adapted to reduce the size thereof to length and width dimensions of about 0.2 times to about 8 times the cross section of the fuel pellets to be made therefrom; and
   (c) feeding said size-reduced elements through a pellet mill, including forcing said elements through die holes in a pelletizing die, to form pellets of said fuel, said pellets comprising bonded layers of said elements disposed transverse to the axial lengths of said pellets, said transverse layers extending across an entire transverse dimension of said pellets and with said layers randomly enfolded with and overlapping each other.

2. A method as in claim 1 and including selecting in part (a), as said first cellulosic fiber element, a mixture of (i) about 70% to about 85% by weight of a first cellulosic fiber component having a first density and (ii) about 15% to about 30% by weight of a second cellulosic fiber component having a second density greater than said first density.

3. A method as in claim 1 including selecting, in paragraph (a), disposable diaper stock having cellulosic fiber and thermoplastic resin materials, whereby said cellulosic fiber element is the cellulosic fiber material contained in said diaper stock, and said thermoplastic resin element is the thermoplastic material in said diaper stock.

4. A method as in claim 1 including selecting, in paragraph (a), disposable hygiene pad stock having cellulosic fiber and thermoplastic resin materials, whereby said cellulosic fiber element is the cellulosic fiber material contained in said pad stock, and said thermoplastic resin element is the thermoplastic material in said pad stock.

5. A method as in claim 1 and including selecting said composition of said fuel in paragraph (a) such that
   (i) the heat output of the resultant formed pellets is between about 9,500 and about 11,500 BTU per pound, and such that
   (ii) said pellets are between about 0.37 and about 0.63 inches in cross section, and average about 0.5 to about 1.5 inches in length, whereby said pelletized fuel is consumed in a standard coal fired furnace during approximately the same time period as Type I, II, III, or IV stoker coal admixed therewith.

6. A method as in claim 1, and including the step of separating said pellets so produced, for selected size.

* * * * *